United States Patent [19]

Oliveira, II

[11] 4,179,588

[45] Dec. 18, 1979

[54] ENCODER UNIT FOR MOBILE RADIO TRANSMITTER

[76] Inventor: Joseph P. Oliveira, II, 8060 Willoughby Ave., Hollywood, Calif. 90046

[21] Appl. No.: 851,131

[22] Filed: Nov. 14, 1977

[51] Int. Cl.² .................. H04M 1/50; H04Q 7/04
[52] U.S. Cl. .................. 179/90 K; 179/2 EA; 325/64
[58] Field of Search .......... 179/90 K, 84 VF, 2 EA, 179/2 EB; 325/16, 64; 340/171 PF, 171 R, 365 R, 365 S

[56] References Cited

U.S. PATENT DOCUMENTS

| 3,808,537 | 4/1974 | Sarati et al. | 179/90 K |
|---|---|---|---|
| 3,824,465 | 7/1974 | Blough | 325/16 |
| 3,970,801 | 7/1976 | Ross et al. | 179/84 VF |
| 4,053,717 | 10/1977 | Snider | 179/2 EA |
| 4,087,638 | 3/1978 | Hayes et al. | 340/365 S |

OTHER PUBLICATIONS

"Build This Pocket Data Terminal", Radio-Electronics, Jan., Feb., 1976, Charles Edwards.

*Primary Examiner*—Gerald Brigance
*Attorney, Agent, or Firm*—Keith D. Beecher

[57] ABSTRACT

A multi-frequency encoder unit is provided for a mobile radio transmitter which is constructed as a single unitary package comprising a keyboard, a first printed circuit board positioned adjacent to the rear face of the keyboard and which includes a switching circuit for providing connections from the individual keys of the keyboard to a row of connector pins on the first printed circuit board, a second printed circuit board containing the encoder circuit positioned adjacent to the first printed circuit board and electrically connected thereto by way of the connector pins which are received in connector holes in the second printed circuit board, and which includes a relay inside the encoder which causes the transmitter to be energized only as the pushbuttons of the keyboard are operated, and to be de-energized when the pushbuttons are not operated. A delay is provided so that when a key is operated the transmitter is energized immediately and remains energized for a predetermined time interval to permit other keys to be operated without turning the transmitter on and off. An extra column of pushbuttons may be provided for extraneous controls which do not embrace the delay, and the transmitter is turned on when such keys are operated and turns off the moment such keys are released.

2 Claims, 2 Drawing Figures

ENCODER UNIT FOR MOBILE RADIO TRANSMITTER

RELATED CO-PENDING APPLICATION

Ser. No. 752,203 filed Dec. 20, 1976—Joseph P. Oliveira II.

BACKGROUND OF THE INVENTION

Two-way radio voice communications systems have become extremely popular in recent years, and so much so that the usual prior art voice-communication systems are no longer adequate. Digital and tone signalling equipment are presently in widespread use to provide selective calling in present-day radio voice communication systems, especially in circumstances where the radio system is interconnected to a telephone exchange. The "Touch-Tone" multi-frequency system developed by American Telephone and Telegraph Company for its telephone switching networks has proven to be adaptable to such radio voice-communication systems.

The usual multi-frequency encoder is designed so that when a particular key or pushbutton on a keyboard is depressed, a pair of signalling tones is produced, with each tone being carefully selected to avoid the principal harmonics normally created in speech and music. Multi-frequency signalling has been adapted to radio communication, and has been used satisfactorily in prior art two-way radio voice-communication systems.

The usual prior art multi-frequency encoder unit for mobile radio transmitters includes a keyboard and an encoder generator circuit connected to the keyboard. The encoder generator circuit generates the two distinct tones whenever a particular key on the keyboard is depressed, and these tones serve to identify the particular key. The dual tones are transmitted by the mobile transmitter to the receivers in the system in which they are decoded. In this way, a call may be placed to a selected receiver by depressing a number of keys on the keyboard in a particular sequence corresponding to the selected code for the particular receiver.

The keyboard-encoder unit of the present invention includes a relay which activates the transmitter only when the keys on the keyboard are operated, so that the transmitter is automatically turned off whenever the keys are released obviating any need for a separate main switch.

DETAILED DESCRIPTION

Figure 1:
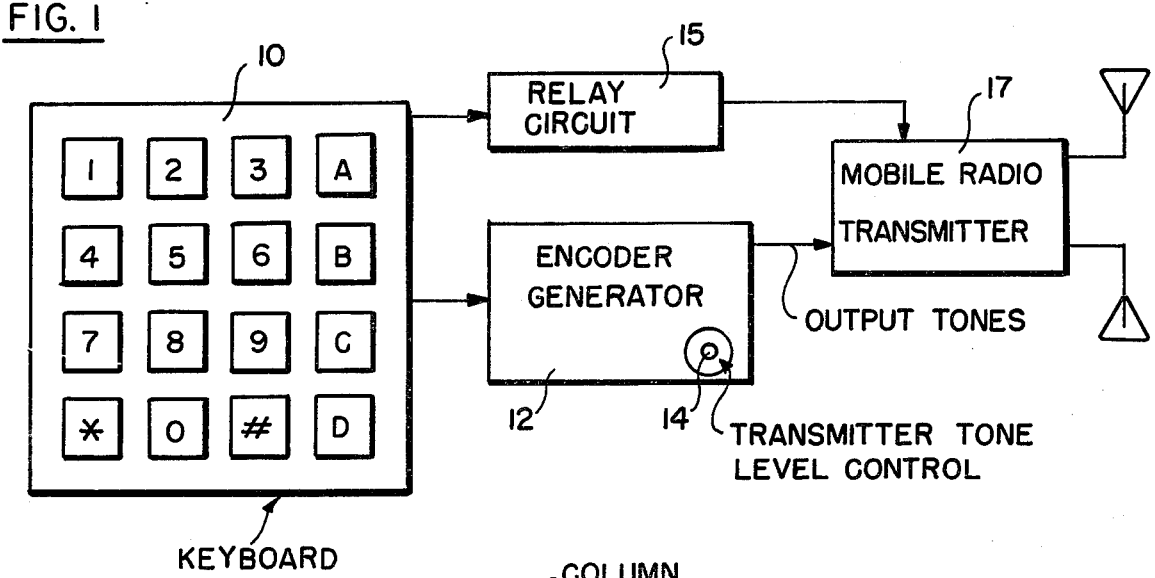
FIG. 1 is a block diagram of a typical multi-frequency encoder unit for use in conjunction with a mobile radio transmitter and which includes a relay circuit in accordance with the teachings of the present invention.

The encoder system shown in FIG. 1 includes a keyboard 10. The keyboard 10 may be a typical multi-frequency keyboard which includes a multiplicity of appropriately identified keys or pushbuttons which, when actuated, perform a switching function for an encoder generator circuit designated by the block 12. The keyboard may be of the type described in U.S. Pat. No. 2,800,104. The encoder generator 12 includes a transmitter tone level control 14. The encoder generator is connected to a mobile radio transmitter 7. The keyboard 10 is also connected to the mobile radio transmitter 16 through a relay circuit 15.

Whenever a particular key on keyboard 10 is operated, the encoder circuit 15 is caused to generate a pair of tone signals corresponding to the particular key. Also, when any key in the left-hand three columns of the keyboard 10 is operated, relay circuit 15 activates the transmitter 17, to enable the transmitter to transmit the tones, and cause the transmitter to remain energized for a predetermined time of, for example, 1–2 seconds after the key has been released. The right-hand column of keys on keyboard 10 also operate relay circuit 15, but without any time lag after the latter keys have been released. The mobile radio transmitter 17 transmits the tones to appropriate receiving equipment. The level of the dual tones applied to the transmitter can be controlled by the tone level control 14.

Figure 2:
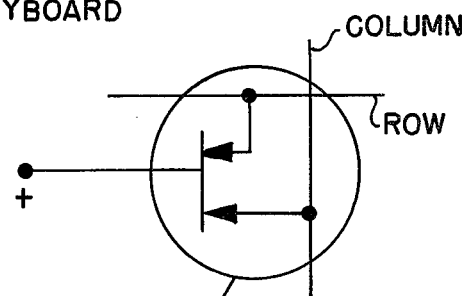
FIG. 2 is a more detailed schematic representation of the block diagram of FIG. 1.
Figure 2:
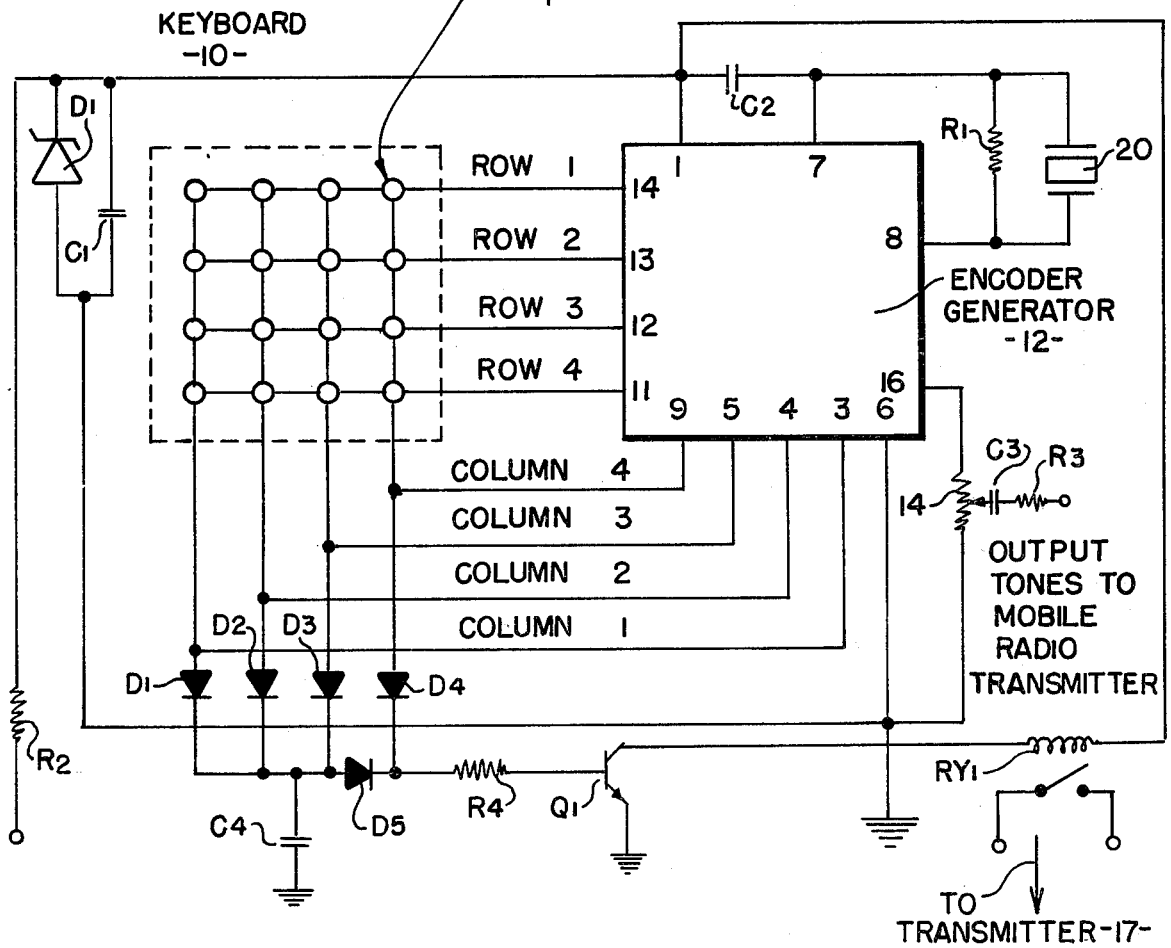

As shown by the schematic diagram of FIG. 2, the encoder generator circuit 12 may be an integrated circuit, which is commercially available, and which is designated as MK5086. The encoder generator circuit is stabilized by a crystal 20 which is shunted by a 10 megohm resistor R1. The crystal 20 and resistor R1 are connected across pins 7 and 8 of the integrated circuit. Keyboard 10 is connected to pins 9, 5, 4, 3 and 11, 12, 13, 14 of the integrated circuit. Whenever a key on keyboard 10 is operated, a dual switching effect is created so that the encoder generator circuit generates a pair of tones identifying the operated key.

Pin 6 of the printed circuit 12 is grounded. Pin 1 is connected through a 300 ohm resistor R2 to the positive terminal B+ of an appropriate energizing potential source. Pin 1 is also connected to a grounded 2.2 microfarad capacitor C1 which is shunted by a Zener diode D1. The positive potential source B+ may have a value of 4.5–16 volts, and its negative terminal is grounded. Pins 1 and 7 of printed circuit 12 are shunted by a 10 picofarad capacitor C2. Pin 16 is connected to potentiometer 14 whose other side is grounded. The movable contact of potentiometer 14 is coupled through a 0.1 microfarad capacitor C4 and through a 51 kilo-ohm resistor R3 to the mobile transmitter.

The four columns of keyboard keys, as shown in FIG. 2, are connected to respective diodes D1, D2, D3 and D4. Diodes D1, D2 and D3 are connected to a grounded capacitor C4 which may have a capacity of 15 microfarads. Capacitor C4 is connected through a diode D5 to a 150 kilo-ohm resistor R4, and the fourth column of keys is connected through a diode D4 to resistor R4. Resistor R4 is connected to the base of an NPN grounded emitter transistor Q1 which may be of the type designated 2N2222. The collector of transistor Q1 is connected through the energizing coil of relay RY1 and through resistor R2 to the positive terminal B+ of the unidirectional potential source.

It will be appreciated that when any key on the first three columes of the keyboard is operated, relay RY1 is energized, and remains energized for a time determined, inter alia, by the capacity of capacitor C4. The relay includes a normally open pair of contacts which are connected to the transmitter 17 to activate the transmitter. When any key in the fourth column is released, the de-energization of the relay RY1 is instantaneous. However, the fourth column of keys can also be caused to incorporate the delay function, if so desired, by providing a jumper across diode D5. The delay normally is two seconds, but can be adjusted by changing the value of capacitor C4.

Thus, whenever a key on keyboard 10 is actuated, a dual switching function occurs, as shown in the circled detailed section of FIG. 2, so that the encoder circuit 12 produces a pair of tone signals at its output pin 16 in FIG. 2, these tone signals being introduced to the mobile radio transmitter through the circuit C3, R2 at a level established by the setting of potentiometer 14. Each time a key is activated in the first three columns of the keyboard 10, the encoder generator is energized and remains energized for a predetermined time. Each time a key is actuated in the fourth column of the keyboard, the transmitter is instantaneously de-energized whenever the key is released.

The invention provides, therefore, a simple and compact keyboard-encoder generator unit which incorporates a pair of printed circuit boards, one performing a switching function and the other forming the encoder circuit, the boards being contained within a housing which is attached to the keyboard; and which includes a relay circuit so that the mobile transmitter may be energized only as the keys of the keyboard 10 are operated, either with a delay or without a delay, as explained above.

It will be appreciated that although a particular embodiment of the invention has been shown and described, modifications may be made. It is intended in the claims to cover the modifications which come within the true spirit and scope of the invention.

What is claimed is:

1. The multi-frequency encoder unit comprising: a keyboard switching circuit including a plurality of keys; a mobile radio transmitter; an encoder generator connected to said keyboard switching circuit and controlled thereby to generate selected dual tones for application to said mobile radio transmitter upon the selective operation of said keys; a relay including an energizing coil and a pair of contacts, said contacts being connected to said mobile radio transmitter to activate said transmitter when said energizing coil is energized; and circuit means including a plurality of diodes connecting said energizing coil to said keys so that actuation of any one of said keys causes the energizing coil to be energized to activate said transmitter, and said circuit means further including capacitor means for causing said relay coil to be de-energized a predetermined time interval after said keys are released.

2. The multi-frequency encoder unit defined in claim 1, in which said keyboard switching circuit includes a plurality of additional keys; and further circuit means connecting said additional keys to said energizing coil and by-passing said capacitor means to cause said energizing coil to be energized whenever any one of said additional keys is actuated and to be de-energized without a time delay whenever said additional keys are released.

* * * * *